Oct. 23, 1928.

Re. 17,112

A. C. SMITH

LINING TRIMMING MACHINE

Original Filed Aug. 14, 1923 2 Sheets-Sheet 1

INVENTOR.
Archibald C. Smith
By his Attorney,
Harlow M. Davis

Oct. 23, 1928.

Re. 17,112

A. C. SMITH

LINING TRIMMING MACHINE

Original Filed Aug. 14, 1923 2 Sheets-Sheet 2

INVENTOR-
Archibald C. Smith
By his Attorney,
Harlow M. Davis

Reissued Oct. 23, 1928. Re. 17,112

UNITED STATES PATENT OFFICE.

ARCHIBALD C. SMITH, OF ROCHESTER, NEW YORK, ASSIGNOR TO UNITED SHOE MACHINERY CORPORATION, OF PATERSON, NEW JERSEY, A CORPORATION OF NEW JERSEY.

LINING-TRIMMING MACHINE.

Original No. 1,618,235, dated February 22, 1927, Serial No. 657,442, filed August 14, 1923. Application for reissue filed August 11, 1928. Serial No. 299,081.

This invention relates to trimming machines and is herein illustrated as embodied in a machine designed to tri n the linings of shoes.

In the manufacture of certain kinds of shoes, for example, pumps and other low shoes, it is customary to trim off portions of the lining which project beyond an edge or edges of the upper, the lining and upper being fastened together by a line of stitches located close to the edge of the upper. Such projecting portions of the lining material commonly remain on the shoe until the shoe is otherwise finished.

A machine for performing trimming operations of this general type adapted to sever the lining which projects above the top of a shoe is shown in Letters Patent No. 1,406,335, granted upon an application filed in the name of Boulton. In that machine there is provided a flat work-support, having a stationary shear member against the vertical face of which a vertically reciprocating knife rubs. Owing to the rapid reciprocation of the knife, this rubbing action tends to heat the knife and thereby to draw its temper. The knife then becomes dull and, instead of making a clean cut, tends to drag the stock between it and the shear member.

According to one feature of the present invention, a sharply curved shear member is provided. In the illustrated machine the shear member is a rotatable beveled cutter which acts also to aid in supporting the work. By providing a rotatable shear member, the liability which formerly existed of drawing the temper of the knife is greatly lessened since the shear member turns, as the work is fed over it, and presents new surfaces successively to the rubbing action of the reciprocating knife. The improved construction also facilitates the feeding of the work and the turning of work when sharply curved edges are encountered, and tends to the production of a cleaner cut.

This and other features of the invention, including certain details of construction and combinations of parts, will be described as embodied in an illustrative machine and pointed out in the appended claims.

Referring to the accompanying drawings, Figure 1 is an end elevation of a machine in which the present invention is embodied, the machine being equipped with a shear member which is adapted more particularly to facilitate the severing of the lining which projects beyond the edge of the upper at the top of the shoe.

Figure 1:
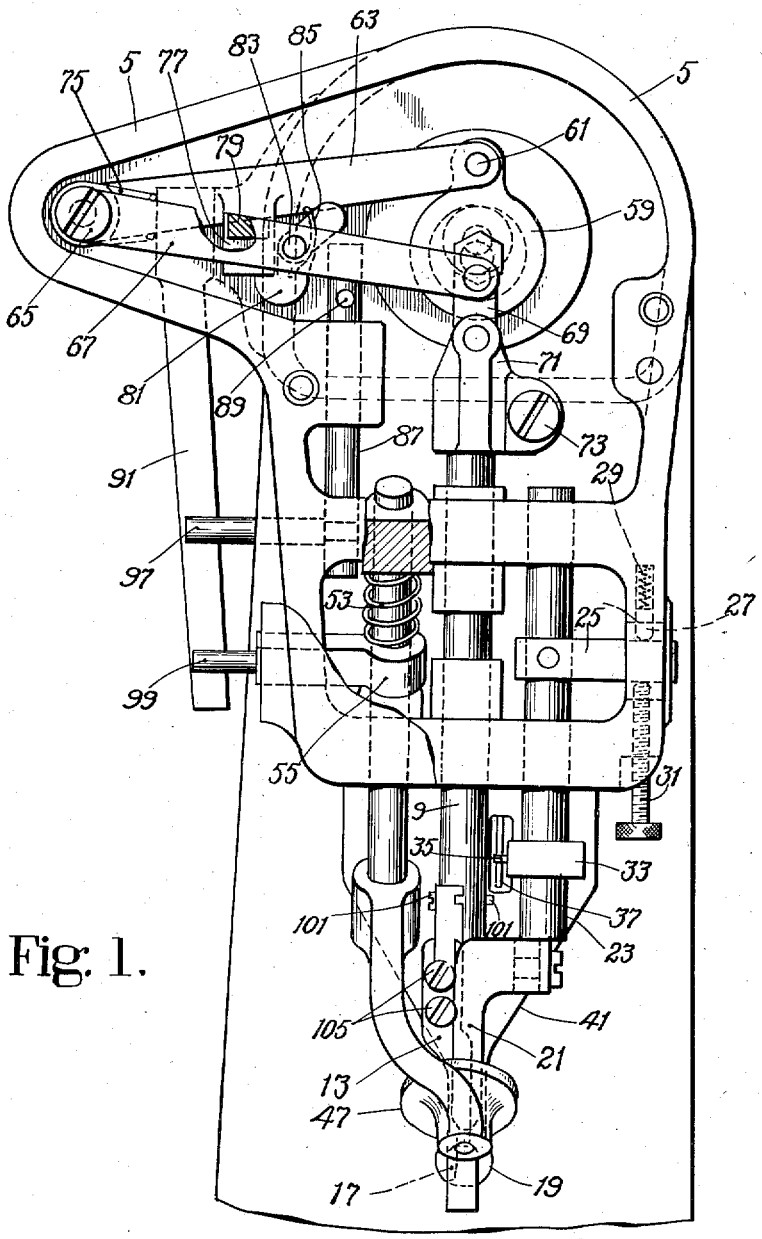
Figure 2:
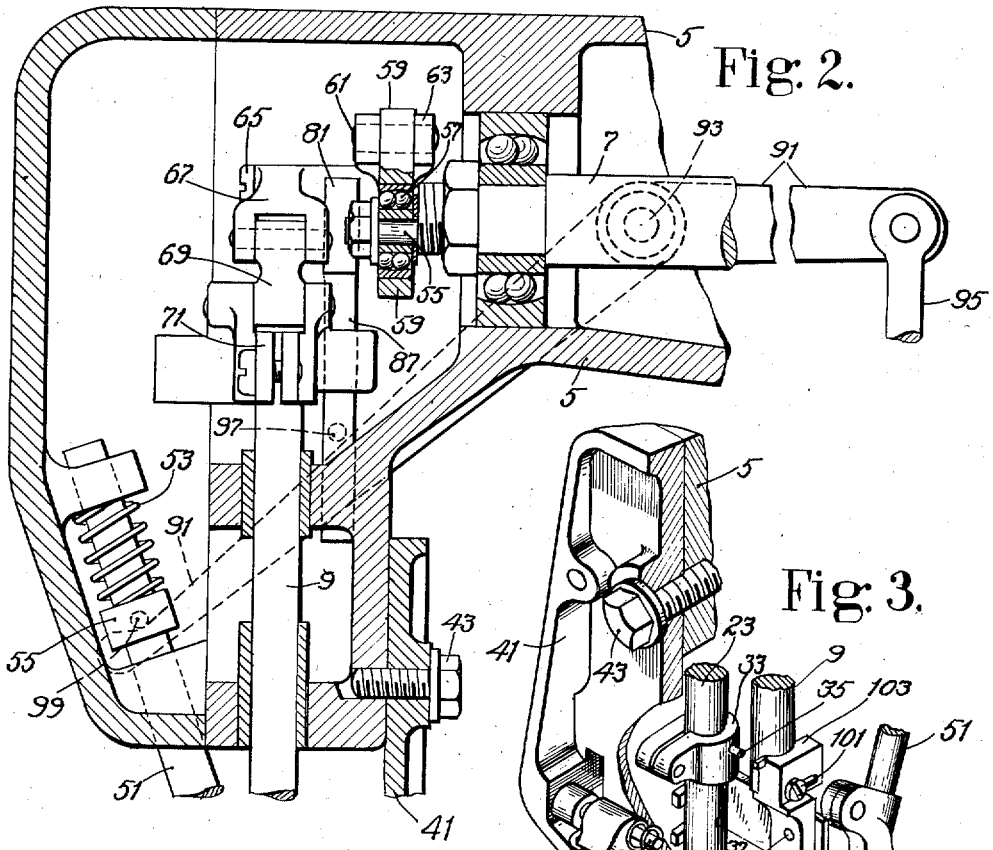
Fig. 2 is a vertical longitudinal section through a part of the forward end of the machine.
Figure 3:
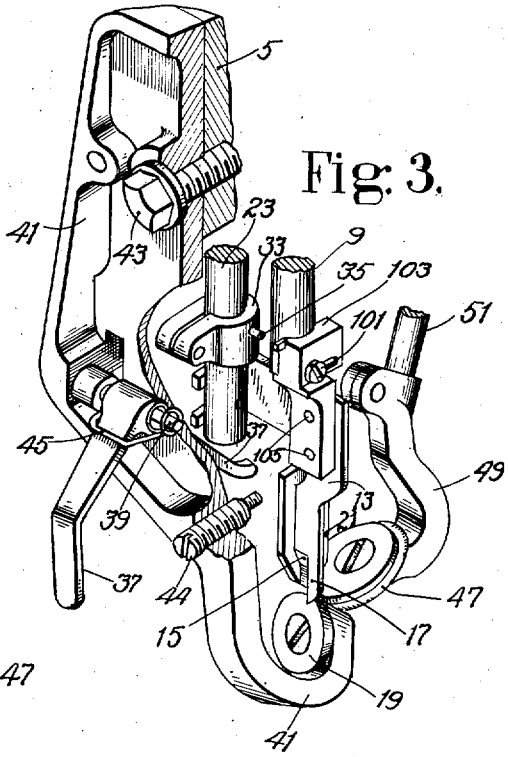
Fig. 3 is a perspective showing more particularly the parts of the machine which engage the work.
Figure 4:
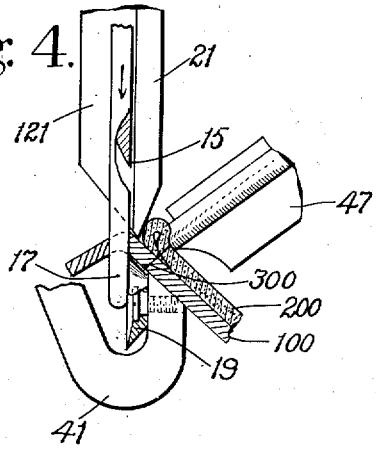
Fig. 4 is an elevation on an enlarged scale of the work-engaging parts, a portion of the top of a shoe being shown in process of being operated upon.

The illustrative machine, shown in Figs. 1 to 4, comprises an overhanging arm 5 which, like that of the machine, disclosed in the Letters Patent referred to, carries all the work-engaging parts. Rotatably mounted in bearings in the arm 5 is a driving shaft 7 which may be rotated by any suitable application of power. Connected with this shaft, in a manner which will appear later, is a cutter or knife-bar 9, which is vertically slidable in bearings formed in the over-hanging arm, it being understood that rotation of the shaft 7 causes reciprocation of the cutter-bar. Fastened to the lower end of the bar 9 is a cutter or knife the shape of which is best shown in Figs. 3 and 4, said knife comprising a beveled cutting edge 15 and a guide 17 which is in contact with a portion of the substantially vertical face of the rotatable shear cutter 19 at all times during the reciprocation of the knife.

Located adjacent to the cutter is a combined gage and guard. This member is right-angled in cross-section and comprises a plate 21 the plane of which is in the line of feed of the work and a plate 121 the plane of which is transverse to the line of feed. The plate 121 guards that side of the cutter which first engages the work, its function being principally to prevent accidental injury to the fingers of the operator. The plate 21 has a beveled lower end adapted to extend into the angle between the lining 100 and the edge of the upper 200 close to the line of stitches 300 by which the two are joined, for example, at the top of a pump or other low shoe. This plate acts to separate the lining and the upper by bending the lining away from the upper; aids in guiding the work by engagement with the edge of the upper and prevents the knife from accidentally injuring the upper. The construction and mounting of this guard and gage member are the same as that of the machine disclosed in the above-mentioned Letters Patent, the member being fast to the lower end of a vertical rod 23 the upper end of which is fast to a vertically slidable block 25, said block having a pin 27 extending into a vertical socket formed in the arm 5 and being acted upon by a compression spring 29 located in the socket. The spring tends at all times to urge the block 25, and with it the guard, downwardly. In order to limit the extent of this downward movement, a set-screw 31 is threaded through a portion of the arm 5 and engages the under side of the slide block 29.

When, in the operation of the machine, a seam is encountered, as is frequently the case when trimming the lining which projects from the top of a shoe, it is desirable to lift the guard. To this end, there is adjustably clamped to the bar 23 a collar 33 having extending from one side thereof a pin 35 with which one arm of a bell-crank lifting lever 37 may be caused to contact. The hub of this lever is loosely mounted upon a small horizontal rod 39 carried by a boss on a bracket 41, this bracket being fastened to the overhanging arm 5 by a cap screw 43 and being in effect a part of said arm. As best shown in Fig. 3, the right-hand arm of the bell-crank lever 37 extends beneath the pin 35, so that, when the bent left-hand arm of the bell-crank 37 is pressed downwardly or toward the right by the operator, the pin 35 is engaged and the guard lifted. A spring 45 having one end coiled about and fast to the pin 39 and having the other end extending over one arm of the bell-crank lever, tends to hold the lever in the inoperative position shown. An adjustable stop-screw 44 limits the swinging of the bell-crank lever in one direction and consequently the extent to which the guard will be lifted. The purpose of the stop is to prevent the guard from being lifted high enough to permit the upper to move beneath it into the path of cut of the knife.

The work-support comprises the lower portion of the bracket 41 shaped as shown and, rotatably mounted on it, the rotary shear member 19 in the form of a frusto-conical beveled cutter having a dished face and a fluted or milled periphery. The latter characteristic aids in the rotation of the shear member by the work, a result which is also facilitated by the fact that the guide 17 of the knife is off center with respect to the vertical median line of the shear member. When, as sometimes happens, the shear member 19 is prevented from turning automatically either by tight connection with its supporting bracket 41 or by dirt or fuzz wedged into a crevice beween it and its pivot or the bracket, the sharp segments of the shear member may be placed successively in operative position by turning said member manually, from time to time, as occasion requires. The dished formation of the face of the shear member lessens the friction between it and the reciprocating knife and tends to the production of a clean cut. The operative surface which supports the superposed upper and lining, as best shown in Fig. 4, comprises the curved upper surface of the extremity of the bracket 41 and the adjacent surface of the frusto-conical shear member 19, the two surfaces being continuations one of the other and being inclined to the vertial plane of the cut of the knife so that the lining is severed on a bevel.

The rotatable shear member, it will be noted, is of comparatively small diameter so that the shoe may be turned on a short radius and the cut caused to progress along sharply curved edges of the upper.

In order to facilitate the presentation and feeding of the work, there may be provided a presser 47 in the form of a roll rotatably mounted in a holder 49 which is carried at the lower end of a rod 51, said rod being mounted for sliding movement in bearings formed in a cover which is fast to the overhanging arm 5, and urged downwardly by a spring 53 pressing against a stop-collar 55 adjustably fastened to the rod and limiting its downward movement.

In the operation of the machine it is desirable at times to disconnect the reciprocating knife from its driving mechanism and at the same time lift it into a position in which its edge 15 is above the work so that a new piece of work may be accurately presented to the machine. Carried at the outer end of the shaft 7 is a pin 55′ which is located eccentrically with respect to the axis of the shaft. Mounted upon the pin is a ball bearing 57, and mounted upon the bearing is an eccentric strap 59 having pivoted at 61 to an upward extension of it one end of a link 63, the other end of which is pivoted on the smooth portion of the stem of a screw 65 which is carried by the stationary overhanging arm 5. Also pivoted upon this screw is one end of a second link 67, the other end of which is pivoted to the upper end of a short link 69 the lower end of which is pivoted to a block 71 in a socket in which the upper end of the knife-bar 9 is held by a pinch-screw 73. A spring 75, coiled about the stem of the screw 65, has one of its free ends resting upon the top of the link 67 and the other free end in contact with the under side of the link 63. The spring thus tends at all times to swing the links oppositely about the axis of the screw 65. In order normally to hold them in the relative positions shown so that rotation of the driving shaft will cause reciprocation of the knife-bar 9, the upper link 63 has a lug 77 which extends beneath a lug 79 on the lower link 67;

and a latch 81 pivoted at 83 to the lower link extends beneath the lug 77. The latch is urged at all times to swing in a clockwise direction by a spring 85 which extends from beneath the lower link, around the pivot 83 and up over the tail of the latch. When, now, the shaft 7 is rotated, the link 63 is oscillated about the screw 65; and the same oscillation is imparted to the link 67, since the links are positively held from angular movement with respect to each other. The outer end of the link 67 is connected with the knife-bar 9 in the manner which has been described, and consequently the knife-bar is reciprocated.

In order to permit the latch to be tripped and the link 67 to be raised and held raised when desired, a rod 87 slidable in vertical bearings in the stationary arm 5 is located below the tail of the latch and has extending from one side thereof and beneath the lever 67 a pin 89. When, therefore, the rod 87 is pushed upwardly, its upper end disengages the latch from the lug 77, and the pin 89 engages and raises the link 67 against the force of the spring 75. The knife 27 is thus disconnected from its driving mechanism and held raised, well above the work-support. As soon as the rod 87 is permitted to descend, the spring 75 depresses the link 67 into the position shown, which is as far as the lugs 77, 79 will permit; and the spring 85 causes the latch to engage once more the under side of the lug 77. The links 63, 67 are thus once more held positively from angular movement with respect to each other, and the knife is reciprocated. The rod 87 is raised by means of a lever 91 pivoted at 93 to the stationary arm 5 and having pivoted to its outer end a treadle rod 95 to the lower end of which a treadle (not shown) is connected. The left-hand end of this lever, as viewed in Fig. 2, when swung upwardly, engages the under side of a pin 97 which is carried by the rod 87. In order to cause the presser 47 to be raised when the knife is raised, the left-hand end of the lever 91 engages beneath a pin 99 carried by the collar 55.

When the knife is raised, it is desirable that the guard 21 should be raised with it. For this reason, the end of the screw 101 (Fig. 1) is located directly below the pin 35 and engages the pin 35 when the knife bar is raised. This screw 101 serves adjustably to fasten to the knife-bar 9 the block 103 to which the knife is adjustably fastened by the screws 105.

In trimming the lining which projects beyond the edge of the upper at the top of a shoe, the shoe is so held by the operator that the work-support enters it and permits it to be manipulated in such manner as to sever all of the projecting lining. As viewed in Figs. 3 and 4, the work is fed toward the observer. The member 21 extends into the angle between the lining and the edge of the upper, said upper lining in a leather shoe being fastened together by a row of stitches 300 which are close to the edge of the upper. The lining to be severed passes beneath the member 21 while the edge of the upper contacts with one side of it, the lining being held by the member 21 against the beveled periphery of the shear cutter 19, and the cut being made on a bevel. The shear member, by reason of its rotation, presents a fresh portion to the reciprocating knife at short intervals, thereby lessening the liability of detrimental heating. At the same time the small diameter of the circular shear member and its consequent sharp curvature facilitate the feeding of the work, particularly when sharp curves are encountered such as those often present in the tops of pumps and other low shoes, and tend to the production of a clean cut. Moreover, the sharply curved convex work-supporting surface of the shear member is well adapted to support curved portions of the upper from the inside thereof, as at the rear of the counter portion of the shoe, firmly against the thrust of the lining cutter 9.

Although the invention has been set forth as embodied in a particular machine, it should be understood that the invention is not limited in the scope of its application to the particular machine which has been shown and described.

Having thus described my invention, what I claim as new and desire to secure by Letters Patent of the United States is:—

1. A machine for severing a portion of the lining of a shoe which projects beyond an edge of the upper thereof having, in combination, a work support adapted to enter the shoe so as to support the upper from the inside thereof and to permit the shoe to be moved with respect to it, said work support comprising a rotatable shear member, a lining cutter co-operating with the shear member, and means for operating the cutter.

2. A machine for severing a portion of the lining of a shoe which projects beyond an edge of the upper thereof having, in combination, a work support adapted to enter the shoe so as to support the upper and lining from the inside of the shoe and to permit the shoe to be moved with respect to it, said work support comprising a rotatable shear member, a co-operating cutter to sever the lining, means for reciprocating the cutter, and a gage located adjacent to the cutter and arranged to contact with the edge of the upper.

3. A machine for severing a portion of the lining of a shoe which projects beyond an edge of the upper thereof having, in combination, a work support adapted to enter the shoe so as to support the upper and lining from the inside of the shoe and to permit the shoe to be moved with respect to it, said work support comprising a rotatable shear member of small diameter having a dished face, a co-operating lining cutter having a portion in contact with the margin of said face, and means for reciprocating the cutter.

4. A machine for severing a portion of the lining of a shoe which projects beyond an edge of the upper thereof having, in combination a work support adapted to enter a shoe so as to support the upper and lining from the inside of the shoe and to permit the shoe to be moved with respect to it, said work support comprising a rotatable shear member of small diameter, a co-operating reciprocating lining cutter, and a gage arranged to extend into the angle between the lining and the edge of the upper for facilitating the guiding of the shoe in such manner that the lining is severed close to the edge of the upper.

5. A machine for severing a portion of the lining of a shoe which projects beyond an edge of the upper thereof having, in combination, a work supporting member adapted to enter a shoe and to permit the shoe to be moved with respect to it, said member having an inclined rounded portion, a frusto-conical rotatable shear member of small diameter the conical surface of which is a continuation of the rounded portion of the work supporting member, a co-operating lining cutter, and means for reciprocating the cutter.

6. A machine for severing a portion of the lining of a shoe which projects beyond an edge of the upper thereof having, in combination, a work support constructed and arranged to enter the shoe so as to support the upper from the inside thereof and to permit the shoe to be moved with respect to it, said work support comprising a shear member sharply curved to facilitate the feeding of the work when sharp curves are encountered, a lining cutter constructed and arranged to co-operate with said shear member, and means for operating said cutter.

7. A machine for trimming the linings of shoes having, in combination, a work support comprising a member constructed and arranged to enter a low shoe, a cutter constructed and arranged to co-operate with said member to sever lining projecting beyond the top of the shoe, and means for operating said cutter, said member having a sharply curved convex surface adapted to support curved portions of the upper from the inside thereof firmly against the thrust of said cutter.

8. A machine for trimming the linings of shoes having, in combination, a work support comprising a shear member constructed and arranged to enter a low shoe, a cutter constructed and arranged to co-operate with said member to sever lining projecting beyond the top of the shoe, and means for operating said cutter, said member having a circular surface of small diameter to facilitate turning the shoe on a short radius when a sharp curve of a shoe is encountered and to support the upper from the inside thereof, at the rear of the counter portion of the shoe, firmly against the thrust of the cutter.

9. A machine for trimming the linings of shoes comprising a circular work-supporting member formed with a circular shearing edge and arranged to enter the top of a low shoe or pump, trimming mechanism provided with a cutter arranged to co-operate with a segment of said shearing edge to sever surplus lining material projecting beyond the top of the shoe or pump, and means for supporting said work-supporting member so that it may be turned about its axis to bring segments of said shearing edge successively into co-operative relation with said cutter.

In testimony whereof I have signed my name to this specification.

ARCHIBALD C. SMITH.